United States Patent [19]

Taylor

[11] 4,404,670
[45] Sep. 13, 1983

[54] PICKUP ARM RETAINER FOR VIDEO DISC CARTRIDGE

[75] Inventor: Byron K. Taylor, Carmel, Ind.

[73] Assignee: RCA Corporation, New York, N.Y.

[21] Appl. No.: 363,392

[22] Filed: Mar. 29, 1982

[51] Int. Cl.³ .............................................. G11B 1/00
[52] U.S. Cl. .................................... 369/170; 369/292
[58] Field of Search ............... 369/170, 173, 126, 292; 29/25.42, 854, 857, 860

[56] References Cited

U.S. PATENT DOCUMENTS 4,256,311 3/1981 Allen et al. .......................... 369/170
4,342,394 8/1982 Taylor .................................. 369/170

Primary Examiner—Steven L. Stephan
Attorney, Agent, or Firm—E. M. Whitacre; J. S. Tripoli; E. P. Herrmann

[57] ABSTRACT

A retainer for holding the stylus arm of a video disc signal pickup cartridge is described which is low cost and occupies little space in the cartridge. The retainer is formed from flat spring stock and shaped to have a three-sided body with fingers extending from the parallel sides to encompass and hold the stylus arm. The retainer is inserted through a top wall of the cartridge and spring tabs which are formed in the sides of the retainer body engage opposite surfaces of the top wall to secure the retainer thereto.

9 Claims, 6 Drawing Figures

PICKUP ARM RETAINER FOR VIDEO DISC CARTRIDGE

This invention relates to a signal pickup enclosure assembly and more particularly to the pickup cartridge for a high density disc record playback apparatus, e.g., a capacitance video disc system.

A commercially available video disc system incorporates apparatus for recovering recorded signal from a disc record. The signal is recorded in extremely high density format as geometric variations in an information track on the disc record. The signal track density may be in the order of 10,000 tracks per inch and the pitch of the geometric variations may approach 50,000 per inch. The dimensions of the recorded information demand that: (a) the signal recovery transducer have similar dimensions at least at the point it contacts the disc if signal crosstalk is to be avoided; (b) that some means be provided to constrain the transducer to follow the signal track; and (c) means are provided to insure uniform transducer-disc interaction, i.e., pressure, so that foreign material or disc warp do not interrupt signal recovery by lofting the transducer.

In this system, signal is recovered by creating relative velocity between the pickup transducer and the disc. To compensate for deviations in transducer-disc relative velocity, provision is made to translate the pickup transducer along the signal track, i.e., armstretching.

In the commercially available system the signal pickup transducer is supported in a cartridge to facilitate servicing or replacement. The pickup transducer is a dielectric stylus onto which a pickup electrode has been fabricated. The stylus electrode and geometric variations in the disc cooperate to produce a time varying capacitance in accordance with the recorded signal. The time varying capacitance is then converted in the player circuitry to an electrical manifestation of the recorded signal. The stylus is fixed to one end of a relatively long, lightweight stylus arm. The other end of the stylus arm is compliantly secured inside the cartridge enclosure with provision for the stylus to protrude therefrom to engage the disc. A leaf spring is connected between the one end of the stylus arm and the cartridge body to provide electrical connection to the stylus electrode and to provide the appropriate stylus-disc engaging pressure during record playback. U.S. Pat. No. 4,030,124 issued to Allen illustrates a signal pickup cartridge of the type currently supplied with these commercially available video disc players.

The small dimensions of the stylus-stylus arm apparatus makes them very susceptible to damage during handling, e.g., cartridge servicing, assembly or replacement in the player. To prevent such damage it is desirable to hold the stylus-stylus arm assembly retracted within the confines of the cartridge enclosure during handling. Heretofore in the commercially available cartridges, the stylus arm has been held in the cartridge by a relatively long U-shaped spring having a pair of spaced apart leg portions and a cross piece joining the spaced leg portions. The end of the leg portions are coiled to produce the desired spring forces and secured to the cartridge body with the legs paralleling the stylus arm and the cross piece engaging the stylus arm to hold it within the enclosure. The spring is defeated by a protruding member attached to a cover lid which closes over the cartridge when it is mounted in the player (see U.S. Pat. No. 4,030,124).

SUMMARY OF THE INVENTION

The present invention is a retainer for holding the stylus arm in a retracted position in the cartridge which has the advantage of low cost, ease of manufacture, ease of assembly to the cartridge body, and is relatively small in size occupying a relatively small volume and area of the cartridge enclosure.

The retainer is a unibody construction formed from a thin sheet of resilient material (e.g., phosphor bronze spring stock) cut and shaped into a three-sided body having finger-like extensions extending from opposing sides of the body. The sides of the body have counterposing outwardly facing resilient tabs for engaging opposite surfaces of the top wall of the cartridge when the retainer is inserted through a conformal hole therein, to secure the retainer to the cartridge.

The finger-like extensions protrude into the cartridge enclosure and are bent so that their distal ends converge on one another midway between the sides of the enclosure. The fingers engage each other in compression.

The distal ends of the fingers are slightly curved toward the opposite finger to form a rounded arch located to encompass the stylus arm when the stylus arm is in its retracted position.

The stylus arm is disengaged from the fingers by a player mounted protrusion inserted between the fingers to bend them outwardly when the cartridge is secured in the player.

DETAILED DESCRIPTION

Figure 1:
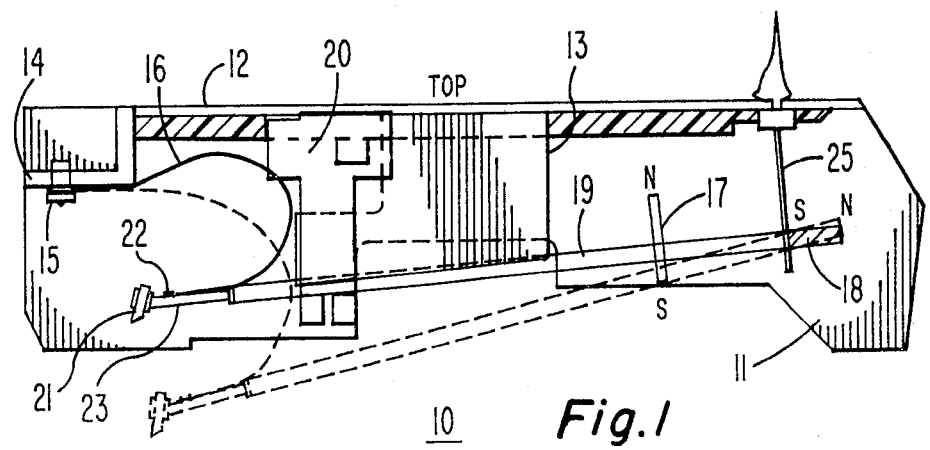
FIG. 1 is a cutaway view of a video disc player signal pickup cartridge.

Referring first to FIG. 1, there is shown an expanded, cutaway view of a signal pickup cartridge 10. The cartridge has sidewalls 11 (only one shown) and a top wall 12 rigidly holding the sidewalls in a spaced apart relationship. The bottom plane of the cartridge 10 is open. The top wall (12) and sidewalls 11 of the cartridge form an enclosure in which a signal pickup stylus 21 is supported.

The pickup stylus 21 is mounted to a stylus holder 23 (e.g., a molded plastic element) which is rigidly attached to the distal end of a longitudinal, lightweight stylus arm 19. The proximate end of the stylus arm 19 is suspended from the top surface 12 of the cartridge by a compliant suspension 25. A leaf spring 16, deformed in a compressive arc is connected between the distal end of the stylus arm 19, and a shelf 14 integral to the cartridge enclosure, and arranged to tend to expel the stylus through the bottom plane of the cartridge. The leaf spring 16 is secured to the shelf 14 by a metallic rivet 15. The leaf spring is typically electrically conductive and serves the dual functions of (a) providing the necessary stylus-disc interactive pressure when the cartridge is positioned for signal recovery, and (b) for providing electrical connection between the pickup stylus electrode and signal processing circuitry (not shown).

In the FIG. 1 configuration, at least the proximate end of the stylus arm is hollow for reception therein of a permanent magnet 18 having north and south poles aligned along the longitudinal axis of the stylus arm. Magnet 18 is designed to cooperate with an electromagnetic coil mounted in the player to provide longitudinal translations of the stylus arm for the purpose of performing stylus-disc velocity corrections, i.e., armstretching, during signal recovery.

A second, generally longitudinal permanent magnet 17 is fixed to the stylus arm 19 nearer its proximate end. Magnet 17 is mounted perpendicular to the stylus arm and arranged so that its longitudinal axis is substantially vertical, i.e., substantially perpendicular to the cartridge top wall 12. The width of the magnet 17 is less than the diameter (width) of the stylus arm and is inserted in a hole punched therethrough. The north and south poles of magnet 17 lie along its vertical axis.

Magnet 17 is arranged to cooperate with a further electromagnetic coil (not shown) mounted in the player for the purpose of twisting the stylus arm to effect lateral translations of the stylus (see U.S. Pat. Nos. 4,183,059 and 4,258,233).

The cartridge assembly includes a retainer 20 for holding the stylus arm assembly in a retracted position within the confines of the cartridge enclosure when the cartridge is not in the player apparatus, e.g., during storage and handling. In the retracted position the stylus arm 19 rests against an inverted cradle 13 molded integral to the cartridge body. The retainer 20 has a pair of resilient fingers 41 and 42 disposed to clamp around the stylus arm 19 holding it in the cradle structure 13. When the cartridge is secured in the player apparatus, the retainer fingers are spread apart releasing the stylus arm and permitting gravity and the leaf spring to pivot the distal end of the stylus arm downward. The approximate postion or orientation of the stylus during signal recovery is indicated by the stylus arm shown in broken lines.

The design of the cartridge was predicated on several commercial and system restraints. These restraints include the use of a small armstretcher magnet (e.g., 18) affixed to the stylus arm and secondly, that lateral translation of the stylus be predictable for a fairly wide range of lateral stylus positions with respect to the centered or relaxed position of the stylus. More specifically, the system must be capable of accurately repositioning the stylus between one, two, etc. disc signal tracks for the stylus engaging any track within a range of for example 100 tracks either side of the track the stylus would engage on being set down on the record. To afford this flexibility, the leaf spring should present relatively uniform compliance to lateral movement over this range while maintaining the desired vertical or stylus-disc tracking pressure. In U.S. Pat. No. 4,337,536 filed Feb. 4, 1980, Taylor disclosed a flyhead (leaf spring) with necked down regions proximate its ends which tended to provide generally greater compliance to lateral stylus motion. In order to realize the desired vertical forces from this structure the flylead was required to depart the stylus holder at a particular angle, approximately 60 degrees to the stylus arm axis. This necked down flylead proved to be successful for use in the commercially available cartridge but was costly to assemble and difficult to handle and therefore deemed inappropriate for the present application.

It was found that the desired parameters for the present application could be achieved by mounting the ends of the leaf spring so that they respectively remained substantially parallel with the plane of the top wall 12 of the cartridge and the longitudinal axis of the stylus arm. This arrangement in conjunction with proper dimensioning of the leaf spring will produce an optimum configuration with respect to uniform lateral compliance and effective vertical resilience.

Lateral displacement of the stylus is performed by twisting the stylus arm relatively slowly in the direction of desired translation causing it to "wind up" on its mounts, and then abruptly releasing the stylus arm. The twisting tends to rock the center of mass of the stylus arm assembly about the point of stylus-disc engagement, translating the center of mass in the desired direction. When the twisting force is abruptly released, the restorative torque developed in the stylus arm mounts (suspension 25 and leaf spring 16) rotates the stylus arm about the center of mass causing a translation of the stylus tip in the desired direction.

Twisting is achieved by subjecting one pole of a permanent magnet (17) to a generally uniform magnetic field produced by selectively energized electromagnetic coils disposed on either side thereof. This mechanism is taught by U.S. Pat. No. 4,258,233 wherein the permanent magnet is affixed in the vicinity of the distal end of the stylus arm so that the coil produced magnetic field, in addition to twisting the stylus arm, produces some direct lateral force thereto by virtue of a net magnetic attraction and/or repulsion. The amplitude of the direct lateral forces depends on the relative position of the permanent magnet with respect to the coils. For the present application where accurate stylus positioning is to be performed over a relatively wide range of stylus positions, it was necessary to minimize the positional dependence of the direct forces. The influence of the direct lateral forces have been reduced in the present cartridge by locating the permanent magnet 17 nearer the proximate end of the stylus arm. Being nearer the pivot point the magnet 17 does not undergo significant lateral translation and therefore the direct lateral forces will exhibit a lesser positional dependence. In addition, the effect of these direct forces on the stylus are significantly reduced by virtue of the magnet being on the shorter end of a lever arm.

The restorative twisting of the stylus arm is provided primarily by the design of the stylus arm suspension member 25. However, the suspension design features which permit the twist and restoration must comport with the suspension design requirements to permit acceptable armstretching (velocity correction). As mentioned before, armstretching is performed by an electromagnet producing a variable magnetic field which interacts with the permanent magnet 18 to generate longitudinal stylus arm motion. The inside diameter of one stylus arm chosen for this assemblage is 0.040 in. which only allows for a very small magnet to be seated therein. Small permanent magnets exhibit small magnetic fields making it impractical to generate significant forces by the interaction of these fields and an electromagnetic coil. Therefore in order to produce longitudinal motion in the stylus arm with such a magnet the stylus arm must be relatively free to move along its longitudinal axis. The freedom of axial movement is a function of the compliance of the stylus arm suspension 25. And finally, since the distal end of the stylus arm is attached to the cartridge by an energy storing element, i.e., the leaf spring, the suspension 25 must be capable of providing some damping effect to axial stylus arm motion.

Figure 2:
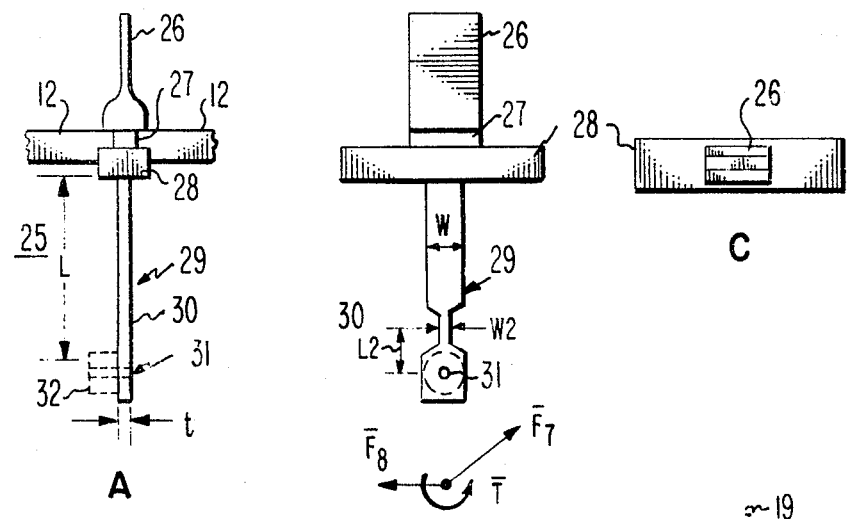
FIGS. 2A, 2B and 2C are side, front and top views of a compliant stylus arm suspension member.

The physical features of the suspension 25 are illustrated in FIGS. 2A, 2B and 2C. FIG. 2A is a side view of the suspension as it is seen in the FIG. 1 cartridge. The suspension is formed of a compliant elastomer having a generally long, flat body which is thin compared to its width. There are two expanded sections 26 and 28 to the suspension separated by a short section 27 for mounting it to the cartridge top wall 12. To attach the suspension 25 to the cartridge the section 26 is squeezed or compressed to pass through the hole 12' located in the cartridge top wall 12. The suspension is pulled through the hole until the section 28 abuts the lower surface of the top wall 12 and the section 26 has cleared the hole. The short section 27 between the expanded sections is shorter than the length of the hole 12' so that when section 26 is released and allowed to re-expand onto the opposite surface of top wall 12, section 27 will be in tension. Sections 26 and 28 will thus firmly hold the suspension to the cartridge by compressive forces.

The expanded section 28 is configured to be accepted in a conformal recess in the top wall 12, thus it also serves to properly position the suspension in the cartridge. When the cartridge assembly 10 is mounted in the player, it is placed in a conformal cavity in an arm carriage and the expanded section 26 provides a convenient handle for removing the cartridge from the carriage for servicing.

The body 29 of the suspension is long and flat and hangs substantially vertically from the top of the cartridge surface 12. There is a hole 31 a distance L from section 28 to receive the stylus arm. The hole 31 may be smaller than the outer diameter of the stylus arm to hold it therein by compression, or, if desired, the stylus arm may be secured by an adhesive. A collar 32, shown in broken lines, may be added to preclude the stylus arm from excessively distorting the suspension at the mounting hole 31, or for providing means to more securely attach the stylus arm to the suspension. The length L, width W and thickness t are dimensioned to afford the desired compliance in the direction normal to the flat surface. One particular example of suspension dimensions for a cartridge having a 1.65 inch long stylus arm made from thin wall aluminum tubing having an outer diameter of 0.045 inch are; length L of 0.30 inch, width W of 0.12 inch and thickness t of 0.015 for a suspension composition of butyl rubber of hardness 30 durometer Shore "A".

It was found that a suspension having uniform length, width and thickness would not simultaneously provide both the desired longitudinal compliances for arm-stretching and the tortional compliance for lateral stylus translations, i.e., twisting. The desired torsional compliance is achieved by reducing the width of the body 29 over a relatively short area 30, located a relatively short distance L2 from the hole 31 without substantially affecting the longitudinal compliance of the system. Note (FIG. 1) that the orientation of the stylus arm is established by the stylus resting on the disc and its proximate end being suspended via the suspension 25. The arm-stretching forces are provided in the direction axial to the hole 31 and along the stylus arm. For the narrowed area 30 to affect longitudinal compliance, the stylus arm must be disposed to bend or pivot about that area of the suspension, but the orientation of the stylus arm and the direction of the armstretcher forces preclude such bending and thus the effect of the narrowed area 30 to longitudinal compliance is not significant. The width of the narrowed region 30 in the foregoing example is 0.020 inch over a length of approximately 0.030 inch and is located approximately 0.22 inch from the expanded section 28.

Consider the imposition of a magnetic field to the permanent magnet 17 to impart a counter clockwise twisting to the stylus arm. The attractive (repulsive) forces on magnet 17 will create a direct force $F_D$ to the stylus arm tending to cause some lateral (sideways) motion (see the force diagram in FIG. 2B). The reaction of the suspension to the twisting torque will create an effective force $F_T$ directed upwardly and laterally opposite the direction imparted by the direct force $F_D$. The lateral components of force will tend to cancel, minimizing lateral translation of the proximate end of the stylus arm. The narrowed section 30 will permit the suspension to bend about an axis parallel to the axis of the hole. A counter clockwise stylus arm twist will produce tension and compression in the left and right sides of the narrowed section 30 and a general elevation of the proximate end of the stylus arm. The tension and compression produced in the suspension produce a restoring force to twist the stylus arm back to its equilibrium position when the magnetic twisting force is removed. In addition, the force of gravity tending to re-lower the proximate end of the stylus arm from its elevated position aids the restorative torque produced by the suspension.

It will be noted at this point that the grommet-like configuration for attaching the suspension to the cartridge not only facilitates cartridge assembly, but also has the positive effect of not influencing the mechanical parameters of the suspending body 29 because the main suspension body hands freely. The resonant frequencies of the body 29 are thus substantially unaffected by the mount.

Figure 3:
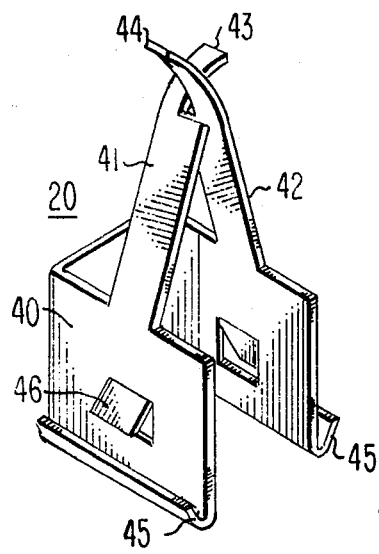
FIG. 3 is a perspective view of a stylus arm retainer included in the FIG. 1 cartridge.
Figure 4:
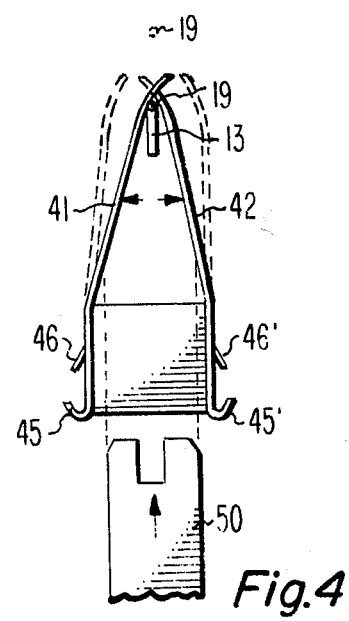
FIG. 4 is a diagrammatic representation of the method by which the FIG. 3 retainer releases the stylus arm.

The stylus arm retainer will next be described with reference to FIGS. 3 and 4. The retainer 20 is an element formed from a contiguous sheet of resilient material, e.g., 0.006 inch thick phosphor bronze spring stock with grade c spring temper, or 0.006 inch thick No. 301, three quarter hard stainless steel selectively shaped and bent to the desired configuration. The retainer has a three-sided body 40 having finger-like members 41 and 42 extending from opposite sides of the body. The fingers are angled inward to converge on each other at a point distant from the body 40 and in a plane substantially midway between two opposing sidewalls. The bottommost extremities of the opposing sides of the body are bent outward and upward to form tabs or flanges 45 and 45'. A three-sided cut is made in each sidewall disposed above the flanges 45 and 45' and the material circumscribed by the cuts is pushed outward to form clip fasteners or tabs 46 and 46'. When the retainer 40 is inserted in the cartridge 10 the flanges 45(45') and the clip fasteners 46(46') are disposed compressively on opposite surfaces of top wall 12 for securely holding the retainer 20 to the cartridge.

The ends of the fingers 41 and 42 are reduced to one-half their width by cutting a rectangular piece from each so that the remaining portions 43 and 44 criss-cross and can come to rest, when unimpeded, on a shelf of the opposite finger created by the cut. The ends of the fingers 43 and 44 are arced slightly inward.

The retainer 20 is inserted in the cartridge through a conformal hole in the top wall 12 with the fingers arranged on their respective sides of the cradle support 13. The fingers 41 and 42 are bent at the sides of the body 40 so that they engage the cradle in compression with the tips 43 and 44 encircling the stylus arm when it is in the retracted position. The stylus arm is released from the fingers by inserting a rigid generally rectangular tongue 50 between them (as indicated in phantom by the broken lines in FIG. 4). The tongue 50 is fixed to a cover (not shown) which closes over the cartridge when it is placed in the player. The stylus arm is removed from the cradle by the force of gravity and the spring force of the leaf spring when the fingers are spread outward.

What is claimed is:

1. A retainer for use in a pickup cartridge to hold a stylus holding arm retracted in the confines of the cartridge enclosure comprising:
    a retainer body having first and second sidewalls separated by a third sidewall;
    first and second counterposing spring tabs protruding outwardly from each of the first and second sidewalls of the retainer body;
    first and second finger-like members respectively extending from respective similar edges of said first and second sidewalls and angled inward to coverage on each other in compression at a point substantially midway between said first and second sidewalls.

2. The retainer set forth in claim 1 wherein the retainer is formed from a contiguous relatively thin sheet of resilient material.

3. The retainer set forth in claim 1 or 2 wherein said respective first spring tabs are formed by bending the edges of said first and second sidewalls distant from the edges from which the finger-like members extend, outwardly by more than 90 degrees in a direction away from the enclosure defined by said three sidewalls.

4. The retainer set forth in claim 1 or 2 wherein the respective second spring tabs are outwardly extending rectangular protrusions having three free edges and a fourth edge contiguous with the associated sidewall.

5. The retainer set forth in claim 1 or 2 wherein a rectangular section is removed from the distal ends of said first and second finer-like members so that the distal ends of said members are made narrower from one side but not foreshortened and so that the remaining portion of the distal end of each fingerlike member can come to rest on an edge of the opposite finger defined by said removed rectangle.

6. A retainer for holding a stylus carrying arm in a signal pickup cartridge enclosure comprising:
    a body element having first and second substantially parallel sidewalls spaced apart by a third sidewall, each of said sidewalls having top and bottom edges;
    first and second flat extensions, extending from the top edge of said first and second sidewalls respectively and angled to converge on each other and engage each other in compression in a plane substantially midway between said first and second sidewalls; and
    means secured to the outward sides of the first and second sidewalls for securing the retainer to one wall of the cartridge enclosure.

7. The retainer set forth in claim 1 or 6 wherein the retainer is formed from phosphor bronze spring stock.

8. The retainer set forth in claim 1 or 6 wherein the retainer is formed from stainless steel.

9. A cartridge for supporting a signal pickup stylus fixed to a first end of a stylus arm a second end of which is compliantly secured in said cartridge comprising:
    a cartridge body having sidewalls spaced apart by a topwall defining a protective enclosure;
    a generally flat support element having a top edge fixed to an inside surface of said topwall, said support element having a bottom edge configured to receive said stylus arm thereon; and
    a retainer formed from resilient material for holding the stylus arm to the bottom edge of said support element, said retainer including;
    a. a body element having first and second sidewalls spaced apart by a third sidewall each of said sidewalls having top and bottom edges;
    b. first and second extensions, extending from the top edges of the first and second sidewalls respectively and angled to converge on each other, a portion of each extension crossing a plane substantially midway between the sidewalls; and
    c. first and second spring tabs separated by a distance less than the thickness of said cartridge topwall arranged near the bottom edge of each of said first and second retainer sidewalls; wherein said retainer is inserted through an aperture in the cartridge top wall with said first and second extensions straddling the support member and converging to encompass said stylus arm thereon, and wherein the respective first and second spring tabs engage opposite surfaces of the cartridge top wall securing the retainer thereto.

* * * * *

UNITED STATES PATENT AND TRADEMARK OFFICE
CERTIFICATE OF CORRECTION

PATENT NO. : 4,404,670

DATED : Sept. 13, 1983

INVENTOR(S) : Byron K. Taylor

It is certified that error appears in the above-identified patent and that said Letters Patent is hereby corrected as shown below:

Column 7, lines 23 and 24, respectively     "coverage" should be --converge--.

Column 7, line 41     "finer-like" should be --finger-like--.

Signed and Sealed this

Twenty-fourth Day of January 1984

[SEAL]

Attest:

GERALD J. MOSSINGHOFF

Attesting Officer     Commissioner of Patents and Trademarks